(12) United States Patent
Singh et al.

(10) Patent No.: US 6,400,376 B1
(45) Date of Patent: Jun. 4, 2002

(54) DISPLAY CONTROL FOR HAND-HELD DATA PROCESSING DEVICE

(75) Inventors: Mona Singh, Cary; Robert M. Lands, Apex, both of NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/217,400

(22) Filed: Dec. 21, 1998

(51) Int. Cl.7 .................................................. G09G 5/00
(52) U.S. Cl. ........................ 345/685; 345/157; 345/158; 345/173; 345/790; 345/794; 345/857; 345/156; 345/863
(58) Field of Search ............................. 345/8, 115, 123, 345/156, 158, 157, 173, 685, 790, 794, 857, 863

(56) References Cited

U.S. PATENT DOCUMENTS

| | | | | |
|---|---|---|---|---|
| 5,485,174 A | * | 1/1996 | Henshaw et al. | 345/123 |
| 5,528,285 A | * | 6/1996 | Morikawa et al. | 348/14 |
| 5,602,566 A | * | 2/1997 | Motosyuku et al. | 345/123 |
| 5,615,132 A | * | 3/1997 | Horton et al. | 395/500.28 |
| 5,648,642 A | * | 7/1997 | Miller et al. | 178/18 |
| 5,703,623 A | * | 12/1997 | Hall et al. | 345/158 |
| 5,841,078 A | * | 11/1998 | Miller et al. | 178/18.06 |
| 6,061,064 A | * | 5/2000 | Reichlen | 345/418 |

* cited by examiner

Primary Examiner—Bipin Shalwala
Assistant Examiner—Vincent E. Kovalick
(74) Attorney, Agent, or Firm—Coats & Bennett, P.L.L.C.

(57) ABSTRACT

A display control for a data storage device which includes a screen portion for visually displaying a part of a virtual page. The display control includes at least one sensor mounted on the device and configured to sense changes in position of the device in a reference coordinate system and transmit signals indicative of the changes. A control circuit is adapted to pan the virtual page over the screen portion responsive to signals from the sensor indicative of the position changes when the control circuit is in a panning mode. At least one touch-responsive first area on the screen portion when touched places the control circuit in the panning mode, and a touch-responsive second area on the screen portion when touched placing the control circuit out of the panning mode. The touch-responsive areas may also be adapted to generate a page signal responsive to being touched by a user, with the screen portion display control adapted to display a selected part of one discrete sub-page of the virtual page responsive to a user touching one of the touch-responsive areas located in a section of the screen portion displaying a portion of the one discrete sub-page. Further, a pointer displayed on the screen portion may be controlled by the sensor, with the pointer adapted to move during user touching of a first area. A program command signal may also be generated responsive to the pointer being located in one of the command areas of the virtual page when touching of the first area by a user ceases.

48 Claims, 4 Drawing Sheets

DISPLAY CONTROL FOR HAND-HELD DATA PROCESSING DEVICE

BACKGROUND OF THE INVENTION

1. Technical Field

The present invention is directed toward devices with data display, and more particularly toward portable, hand-held devices with data display.

2. Background Art

Devices which display different virtual pages of data stored in the device and/or commands for programs in the device are, of course, well known. (A "virtual page" as used herein refers to a two dimensional representation of data and/or program commands, where the two dimensions may be greater than the size of the portion of the screen available to display it so that only a portion of such data/command representation is visible in a display screen at a given time. In a database, for example, each field of data may be visually represented by its own virtual page.) For example, personal computers can be used to display different data or program commands in different, "windows", where the virtual pages of the data and/or program commands in one or more of the "windows" are larger than the windows. To view different portions of the virtual pages in the "windows", the user must scroll or pan through the page (where "scrolling" the virtual pages involves changing which portion of the data and/or program commands is visible on the display screen). In many such displays, particularly with personal computers, panning or scrolling the virtual page is controlled by either movement of a cursor in the displayed portion of the virtual page or by interface with a control bar along the side of the display screen.

In addition to personal computers, however, small handheld devices with display screens are becoming increasingly more common in a wide variety of uses. For example, small hand-held computers are common with small displays (commonly called "personal assistants" or "palm held computers"). Similar "communicators" having cellular communication capabilities and also having computer capabilities with small displays are also in use. Typically, these small portable devices do not and cannot conveniently have conventional input devices such as a mouse. Therefore, common personal computer interfaces, which have their own problems, are not at all suited for these devices.

In many such small devices, therefore, the small displays have touch-sensitive or touch-responsive display screens which sense when a certain area of the screen is touched and respond, typically by changing the display on the screen, based on the area of the screen which is touched. Further, some devices detect motion of the device and, responsive to the motion, either scroll or pan the screen over the virtual pages. However, since such screens are hand held and thus often in motion even when the user does not intend to change the display on the screen, control of such operation can be difficult and frustrating. Further, there are significant limitations on using such small portable devices, including in obtaining output (e.g., viewing data on the screen) and in inputting commands (e.g., to change the area viewed on the screen, or to command the performing of a particular function of a program in the device). For example, the limitation on the size of the screen itself generally it must at least be smaller than the small device itself) can make it difficult if not often impossible to show an entire virtual page on the screen. Of course, even if the information on the virtual page could be shown in text size small enough to fit on the screen, it might be too small to be reliably read by the user (particularly given the relatively low resolution typically provided for such screens). Further, given the limited area available, not only on the screen but also on the entire device, as well as the need to provide for easy and reliable operation when held in one hand, it is particularly difficult to provide adequate and reliable user control of the many desired functions of the device.

The present invention is directed toward overcoming one or more of the problems set forth above.

SUMMARY OF THE INVENTION

In one aspect of the present invention, a display control structure is provided for a data storage device which includes a screen portion for visually displaying a part of a virtual page larger than the screen portion whereby only a portion of the virtual page is displayed in the screen portion. The display control structure includes at least one sensor mounted on the device and configured to sense changes in position of the device in a reference coordinate system and transmit signals indicative of the changes, a control circuit adapted to pan the virtual page over the screen portion responsive to signals from the sensor indicative of the position changes when the control circuit is in a panning mode, at least one touch-responsive first area on the screen portion, the first area when touched by a user placing the control circuit in the panning mode, and a touch-responsive second area on the screen portion, the second area when touched by a user placing the control circuit out of the panning mode.

In one preferred form, the first area is located in a corner of the screen portion, preferably in all four corners of a substantially rectangular screen portion.

In another preferred form, the second area is substantially the entirety of the screen portion when the device is in the panning mode.

In still another preferred form, the second area is the part of the virtual page displayed on the screen portion when the device is in the panning mode.

In another aspect of the present invention, a display control structure is provided for visually displaying a part of a virtual page larger than the screen portion whereby only a portion of the virtual page is displayed in the screen portion. The display control structure includes a plurality of discrete touch-responsive areas in different sections of the screen portion, each of the touch-responsive areas being adapted to generate a page signal responsive to being touched by a user, a sensor adapted to generate a panning signal responsive to selective input by a user, and a screen portion display control adapted to both pan over the virtual page responsive to a panning signal, and to display a selected part of one discrete sub-page responsive to a page signal generated in response to a user touching one of the discrete touch-responsive areas located in a section of the screen portion displaying a portion of the one discrete sub-page.

In one preferred form of this aspect of the invention, the sensor includes at least one orientation sensor mounted on the device and configured to sense changes in position of the device in a reference coordinate system and transmit motion signals indicative of the changes, and a control circuit adapted generate a panning signal responsive to the motion signals. In a further preferred form, a second screen portion display control is provided including at least one touch-responsive first area on the screen portion adapted to selectively place the second screen portion display control in a panning mode whereby the screen portion pans over the virtual page responsive to the panning signal when touched by a user, and a touch-responsive second area on the screen portion adapted to selectively take the second screen portion display control out of the panning mode when touched by a user. A switch is also provided for selectively connecting one of the first and second screen portion display controls to the screen portion.

In another preferred form of this aspect of the invention, the virtual page includes a plurality of sub-pages with each sub-page oriented side-by-side with at least one of the other the sub-pages.

In still another preferred form of this aspect of the invention, the screen portion is substantially as large as each sub-page.

In yet another preferred form of this aspect of the invention, each sub-page is a logical unit of the virtual page.

In still another aspect of the present invention, an interface control structure is provided for a data storage device having a screen portion for visually displaying a pointer and a virtual page including command areas, where the virtual page provides a user interface for generating a command signal to control a program in the device. The interface control structure includes at least one sensor mounted on the device and configured to sense changes in position of the device in a reference coordinate system and transmit signals indicative of the changes, a control circuit adapted to move the pointer in the screen portion responsive to signals from the sensor indicative of the position changes when the control circuit is in a move mode, and a touch-responsive first area adapted to maintain the control circuit in the move mode during touching of the first area by a user.

In a preferred form of this aspect of the present invention, a command control is adapted to generate a program command signal responsive to the pointer being located in one of the command areas of the virtual page when touching of the first area by a user ceases.

In another preferred form of this aspect of the present invention, the control structure further includes a touch-responsive second area adapted to generate a program command signal responsive to the pointer being located in one of the command areas when the second area is touched by a user.

In still further preferred forms, the first and second areas comprise push buttons, with the screen portion disposed on one side of the device and the push buttons located on a side of the device different than the one side.

It is an object of the invention to provide a data displaying device in which data may be conveniently and reliably displayed.

It is another object to provide such a device which allows the user maximum flexibility in controlling the device.

DESCRIPTION OF THE PREFERRED EMBODIMENT

Figure 1:
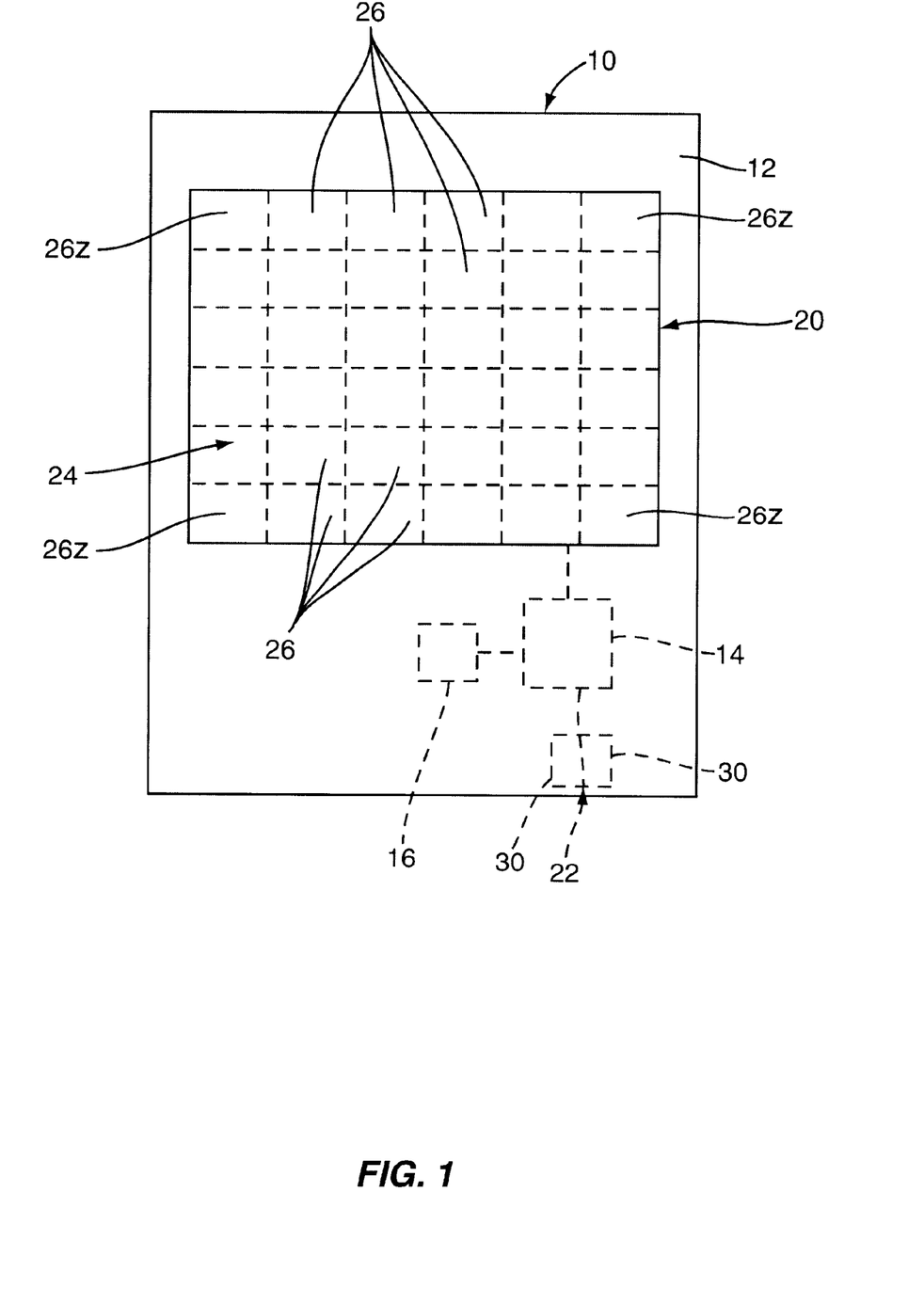
FIG. 1 is a plan view of a hand-held device incorporating one aspect of the present invention.

As seen in FIG. 1, a hand-held data processing device 10 includes a housing 12, a processor 14 mounted on the housing 12 and adapted to process a plurality of commands, a memory 16 for storing data and/or programs used in the device 10, and a user interface 20.

As used herein, "data" refers to any kind of information which can be visually represented, and includes not only data which may be reproduced in tables, but also, for example, data which may be graphically represented in some manner, textual information (e.g., written information), pictures and illustrations, and virtually anything which can be visually displayed to convey something to the viewer. The device 10 is preferably a portable hand-held type computer of some type, including particularly a communicator. For simplicity, other elements of the device 10 (e.g., a keypad, or a microphone or speaker as might be provided with a communicator) are not shown in the illustration.

Broadly speaking, the user interface 20 includes a sensor 22, a visual display or screen 24, and one or more touch responsive areas 26.

In the preferred embodiment, the processor 14 may be provided in the form of any processing circuit capable of processing commands. Many such processing circuits are well known in the art and may be suitably used with the invention. Preferably, the processor 14 is provided in the form of a microprocessor, many of which are known in the art and suitable for use with the present invention, with the particular processor 14 selected based in significant part on the desired functionality of the device 10. The processor 14 further includes a suitable portion or circuit for generating the signals for displaying the desired data on the screen 24. Suitable circuits of this type are also well known in the art and are dependent on the particular screen 24 included with the device 10 (e.g., different display signals are required for LCD [Liquid Crystal Display] vs. cathode ray tube displays). In the FIG. 1 embodiment, such circuits preferably are capable of receiving a signal indicating that the displayed virtual page should be panned in a particular direction and in response generate a suitable signal to the screen 24 so as to control the screen 24 to cause the signalled panning of the displayed data.

Also in the preferred embodiment, the sensor 22 is mounted in the housing 12 to sense changes in position of the housing 12 in the reference coordinate system. These changes in position may include linear displacement and/or angular displacement of the housing in the coordinate system. For example, if the reference coordinate system is an orthogonal system with three perpendicular axes X, Y, and Z, the sensor 22 may be configured to sense both linear and angular displacements of the housing relative to the space defined by the axes X, Y, Z.

It should be appreciated that a variety of sensors would be suitable for use with this embodiment of the invention, where the sensor 22 functions to allow a user to move the device 10 to selectively control what is on the screen 24 (for example, a user could tip the device 10 one way to pan in one direction and tip the device 10 the opposite way to pan in the opposite direction). It should also be appreciated that in some forms of the present invention, a signal indicating that the virtual page displayed on the screen 24 should be panned could instead be generated in response to input other than a signal generated in response to a sensed change in position of the device 10.

In the most preferred embodiment of the FIG. 1 aspect of the present invention, however, the sensor 22 is preferably in the form of a plurality of accelerometers 30, with each accelerometer 30 configured to measure acceleration along or about one of a plurality of non-parallel axes. In a highly preferred embodiment, the sensor 22 includes at least one multi-access silicon accelerometer. There are many known techniques for configuring accelerometers to measure acceleration along or about one or more of a plurality of non-parallel axes and to then process the measured accelerations to determine linear and/or angular displacements of the object to which the accelerometers are mounted. Examples of such processing methods and accelerometers are described in detail in U.S. Pat. Nos. 4,787,051 and 5,615,132, the entire disclosures of which are hereby incorporated herein by reference. Generating a panning signal without use of accelerometers such as in the described preferred embodiment could also be suitably used with the present invention including, as one example, the device for measuring angular displacements described in U.S. Pat. No. 5,528,285, the entire disclosure of which is also hereby incorporated herein by reference.

Referring again to the screen 24 of the first embodiment illustrated in FIG. 1, a plurality of touch responsive areas 26 are provided on the screen 24. Specifically, the screen 24 is provided with suitable sensors such as is known in the art for sensing when specific areas of the screen 24 are touched. For example, as shown by the dashed lines in FIG. 1, different areas may be arranged in a grid-like fashion to sense a touch by a user on any part of the screen 24. It should be appreciated, however, that the present invention does not necessarily require that every point on the screen 24 be touch responsive. Further, such touch responsive areas 26 may be used for a plurality of input commands from a user such as is known in the art. However, in accordance with the present invention, the below described configuration may be easily and reliably used in conjunction with such uses to control panning of the virtual page on the screen 24 without interfering with such commonly understood functioning of such touch responsive areas 26.

Specifically, in accordance with the first aspect of the invention as illustrated in FIG. 1, the four corner touch responsive areas 26z are configured so that when any one of these corner areas 26z are touched by a user, a signal is generated to the processor 14 to place the device 10 in a panning mode. When the device 10 is in that panning mode, the processor 14 will suitably use signals from the sensor 22 to cause the portion of the virtual page to pan over the screen 24 in response to movement of the device 10 in the reference coordinate system such as previously described.

When the device 10 is in the panning mode, all of the touch responsive areas 26 are configured so that when any of the areas 26 is touched by a user, a signal is generated to the processor to take the device 10 out of the panning mode. When out of the panning mode, the processor 14 will not pan the virtual page on the screen 24 notwithstanding any signals which might be received from the sensor 22 indicating any change in position.

With this aspect of the invention, it should be appreciated that the screen 24 will display a steady portion of the virtual page without any unintended, unwanted, and frustrating panning resulting from movement of the device 10 not intended to cause panning. Further, the substantial majority of the touch responsive areas 26 may be used by the device 10 for input from the user (e.g., to execute a program command indicated by an icon in the touch responsive area) during normal, non-panning operation. By touching one of the few areas 26c adapted to change the device to the panning mode, a user can nevertheless readily change the display on the screen 24 according to their needs (by changing the position of the device 10 in the described preferred embodiment) and may easily stop panning by simply touching anywhere on the screen. No precision in which area to touch is required during panning, and the lack of the ability to execute a particular command during panning is of no particular import given that, once panning is stopped, the substantial majority of the touch responsive areas 26 immediately revert to being able to input other commands if desired so that a user can instruct the device 10 to execute a new command by simply touching any area 26 and then immediately touching the particular area in which the icon for the program command desired to be executed has stopped. (Of course, if desired, the processor 14 could also be programmed to not only leave the panning mode when an area 26 is touched but to also execute any program command represented by an icon in the area touched when leaving the panning mode. Such operation might be particularly usable, for example, where panning speed is sufficiently slow that a user can readily determine the appropriate area to touch for an icon moving on the screen 24 as panning occurs.)

It should be recognized that with the above described aspect of the invention, it is desirable in particular to have less than all of the touch responsive areas 26 adapted to take the device 10 out of the panning mode in order to allow use of many of the touch responsive areas 26 to input program commands during non-panning operation. Further, it should be recognized that use of the touch responsive areas 26 to input program commands during panning operation is not an important ability, so that it is desirable to have a large number of the areas 26 to be responsive to stop panning to simplify such an action for the user. However, it should also be recognized that the present invention may still be incorporated in a device which uses a few areas other than the four corner areas 26z to enter the panning mode (including, for example, only one touch responsive area), and has some touch responsive areas which do not necessarily take the device out of the panning mode.

Panning of virtual pages over the screen 24 will thus, with the above described aspect of the invention, be extremely easy, reliable and will be easily remembered by a user without necessitating that portions of the screen 24 be taken up to display commands relating to panning (although it would certainly be within the scope of the invention to display such commands, e.g., appropriate icons in the four corner areas 26z when the device 10 is out of the panning mode).

Figure 2:
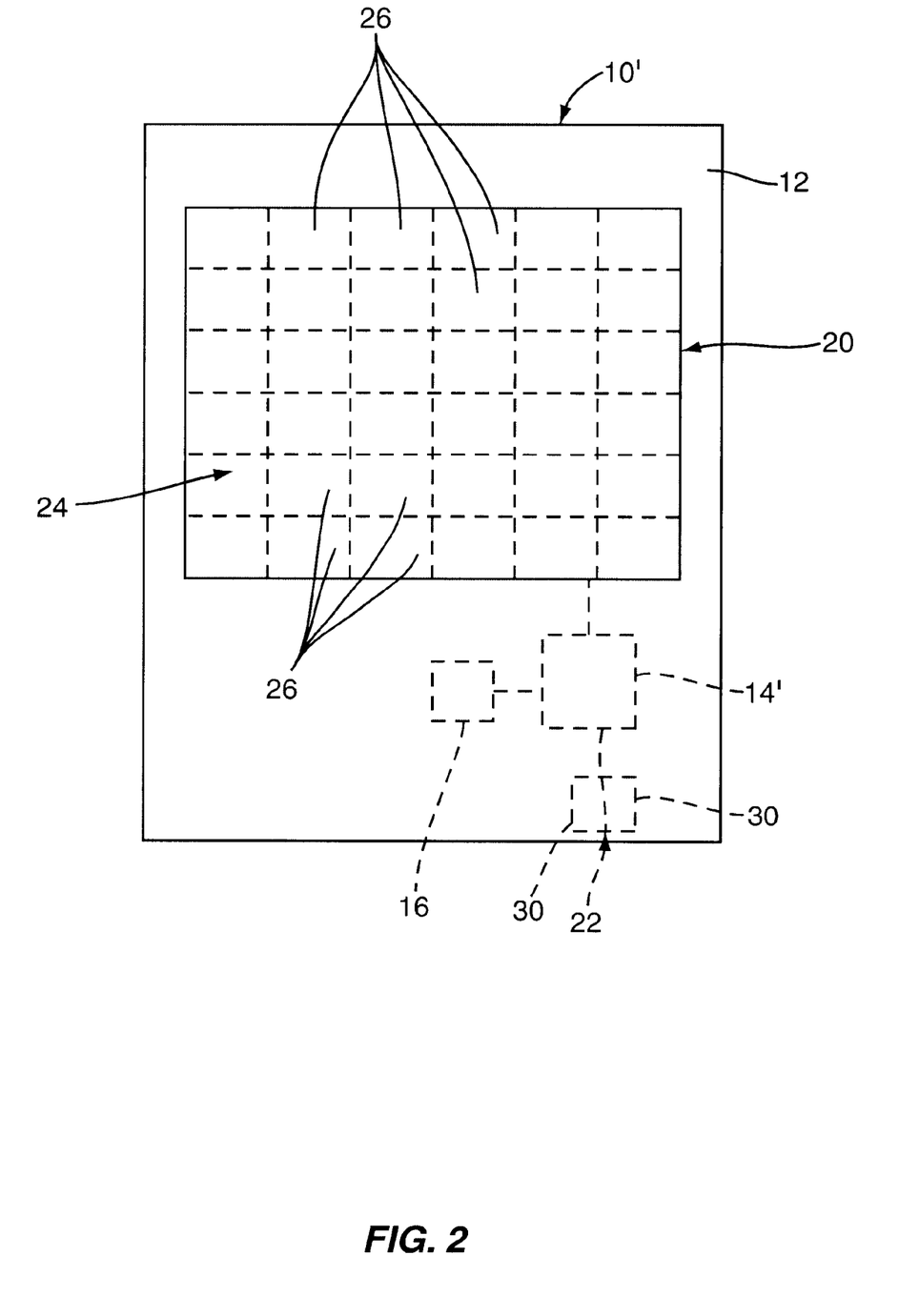
FIG. 2 is a view similar to FIG. 1 illustrating a device operable according to a second aspect of the present invention.

Another aspect of the present invention is shown in FIG. 2, in which many similar or identical components to those described in connection with the FIG. 1 embodiment may be used (and therefore similar reference numerals are used for identical components, with prime ['] added to reference numbers to identify similar components).

Specifically, in the FIG. 2 embodiment, the processor 14' is preferably adapted to permit panning of the virtual page in the screen 24, although without the particular functioning of touch responsive areas 26 such as described above. Nevertheless, panning could occur in response to changes in position of the device 10', or in response to other user input (such as pressing directional buttons, not shown), or any other suitable device.

Figure 3:
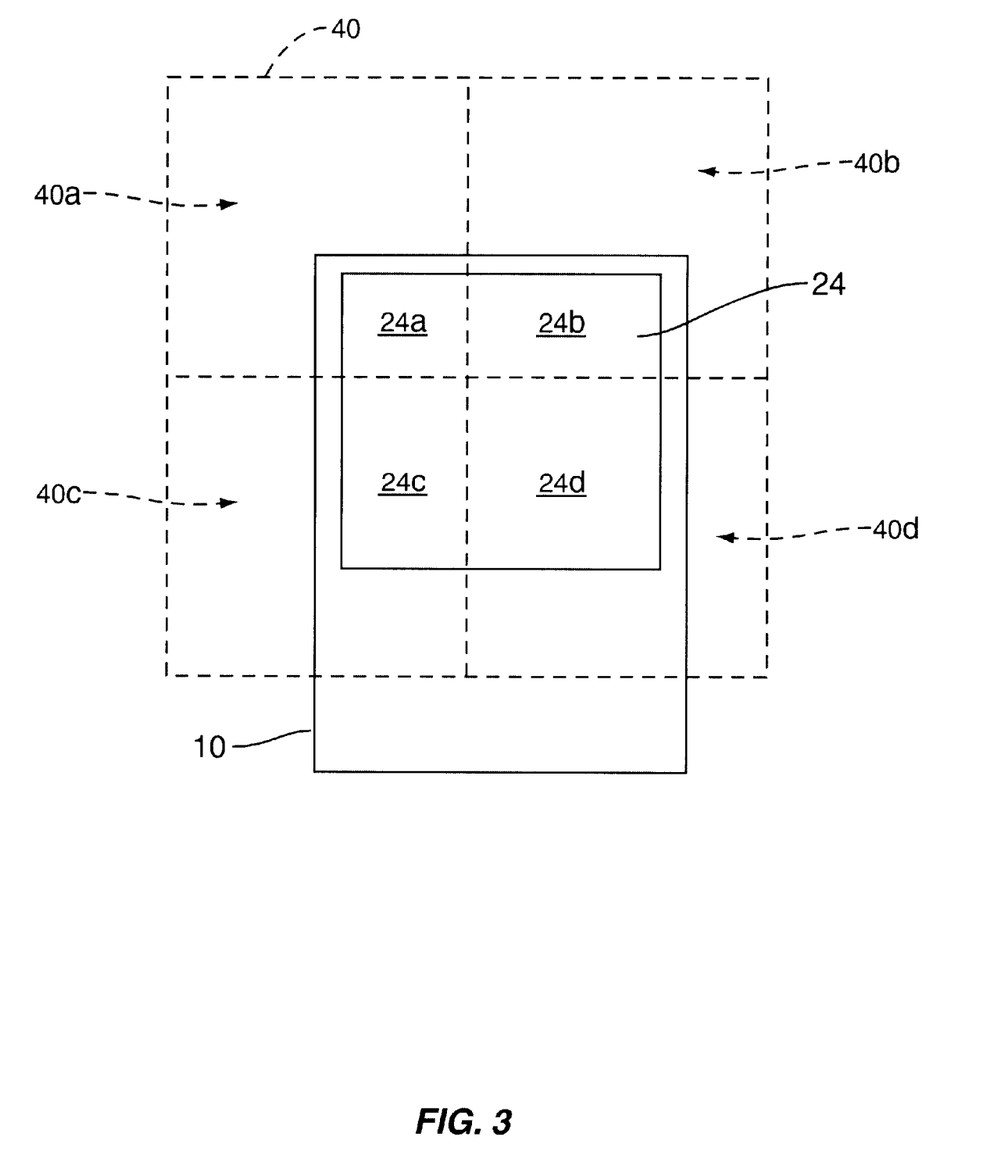
FIG. 3 is a plan view of the device of FIG. 2 also illustrating an exemplary virtual page with the screen portion of the hand-held device displaying a portion of the virtual page.

With the FIG. 2 embodiment, however, the virtual page 40 comprises a plurality of discrete sub-pages 40a–d. That is, in the exemplary embodiment illustrated in FIG. 3, the virtual page 40 consists of a number of sub-pages 40a–d which are each oriented side-by-side with at least one of the other the sub-pages 40a–d (though four sub-pages are illustrated in FIG. 3, it should be understood that the virtual page could consist of different numbers of pages). In the most preferred embodiment, the screen 24 is preferably at least as large as the largest sub-page 40a–d, and each sub-page 40a–d displays data which is a logical unit or portion of the overall virtual page. For example, for a virtual page 40 relating to an information manager, one sub-page-40a could contain data and icons relating to "To Do" items, another 40b could contain data and items relating to a phone book, another 40c to "e-mail", and yet another 40d to phone dialing.

With the FIG. 2 aspect of the invention, the processor 14' is suitably adapted to change the signal to the screen 24 to display the entirety (or a selected portion) of a sub-page responsive to touching by a user of a touch responsive area 26 in which a portion of that sub-page is then displayed. As an example, when use of the phone book is completed (with only the phone book sub-page 40b displayed on the screen 24), the user may suitably cause the virtual page to pan on the screen 24 so as to cause the adjacent sub-pages to also be displayed (such as illustrated in FIG. 3). In the illustrated virtual page 40 (with the "To Do" sub-page 40a at the upper left), at least corners of all four sub-pages 40a–d would be displayed on the screen 24 by panning down and to the right. The user may thus use the display of all four sub-pages 40a–d in the screen 24 as a reminder/indicator regarding the existence and location of the logical units of the virtual page and, once the next desired logical unit is identified, simply touch one of the areas 26 displaying a part of that sub-page and the full (or selected portion) of the sub-page associated with that logical unit will be displayed. For example, touching a touch responsive area 26 in FIG. 3 screen area 24a when the virtual page 40 is displayed as illustrated in FIG. 3 would cause the processor 14' to change to display of the full "To Do" sub-page 40a on screen 24, whereas touching an area 26 in screen area 24b when the virtual page 40 is displayed as illustrated in FIG. 3 would cause the processor 14' to change to display of the full phone book data of sub-page 40b on screen 24, touching an area 26 in screen area 24c when the virtual page 40 is displayed as illustrated in FIG. 3 would cause the processor 14' to change to display of the full e-mail sub-page 40c on screen 24, and touching an area 26 in screen area 24d when the virtual page 40 is displayed as illustrated in FIG. 3 would cause the processor 14' to change to display of the full phone dialing sub-page 40d on screen 24. It should thus be apparent that the display of the screen to be most advantageously controlled without any time consuming or imprecise further panning of the virtual page required to get the desired display on the screen 24.

Figure 4:
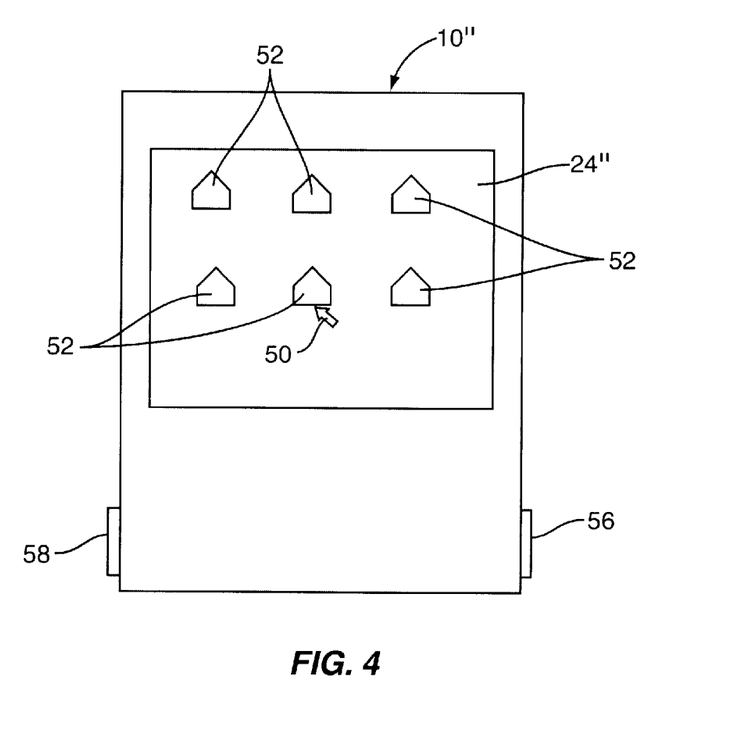
FIG. 4 is a plan view similar to FIGS. 1 and 2 of a device operable according to a third aspect of the present invention.

FIG. 4 illustrates another preferred embodiment of the present invention (with similar reference numerals also used for identical components, with double prime ["] added to reference numbers to identify similar components). Though not shown in this figure for simplicity purposes, this embodiment also includes internal components such as a processor, sensor and memory which may be substantially similar to those previously described herein. In particular, the device 10" preferably includes sensors for detecting changes in position of the device 10" such as previously described, with signals being generated to the processor responsive to such detected changes.

In the FIG. 4 embodiment, the screen 24" displays a suitable pointer 50 such as a cursor, and also includes command areas 52 such as icons program commands which may be processed by the device 10". During operation of the device 10" in accordance with this embodiment of the present invention, the page or background on the screen 24" (e.g., the display of the command areas 52) is stationary and the pointer 50 may be selectively moved by the user. The pointer 50 may be located in a command area 52 on the screen 24" and a signal then generated to instruct the processor to perform an action associated with that command area 52 (similar to clicking a mouse when the cursor is on a program icon in Windows-type personal computing).

Specifically, the device 10" includes a touch-responsive button 56 which, during depression of the button 56 by the user, places the control circuit of the processor in a move mode. When in the move mode, the pointer 50 is adapted to move responsive to sensor signals indicative of position changes such as previously described. The control circuit is out of the move mode whenever the button 56 is not being depressed, and therefore the sensor signals will not cause the pointer 50 to be moved in the display on the screen 24".

In a preferred mode, when the pointer 50 is located by a user in the desired command area 52 (through changing the position of the device 10" while depressing the button 56), releasing the button 56 will both stop movement of the pointer 50 and generate a signal instructing the processor to perform the action associated with the command area 52 at which the pointer 50 is located when the button 56 is released. If no action is associated with the area of the screen 24" at which the pointer 50 is located, there pointer 50 will merely stop moving responsive to further changes in position of the device 10". However, it would be within the broad scope of the invention to simply stop movement of the pointer 50 when the button 56 is released and to provide other input devices by which the user could cause the associated action to be initiated. For example, a second button 58 could be provided for such a purpose.

As illustrated in FIG. 4, it should be appreciated that button 56 could be readily controlled by the thumb of a user holding the hand-held device 10" in their right hand. A second button 58, operating identically to button 56, may also be provided to provide for essentially identical operation by users who hold the device in their left hand. It should be appreciated that a user will commonly hold the device 10" so that its back is in the palm of the user's hand, with the front (including the screen 24") facing away from the user's palm, so that locating the buttons 56, 58 on the sides of the device 10" and near its bottom will be ergonomically advantageous for comfortable use.

Figure 5:
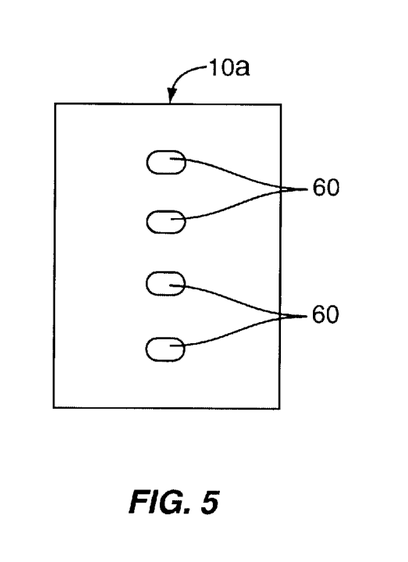
FIG. 5 is a back view of a device illustrating one possible arrangement of buttons usable with a device incorporating the present invention.

Of course, still other button locations could also be advantageously used within the scope of the present invention. For example, as illustrated in FIG. 5, four buttons 60 can be located in the back of the device 10a, as would be particularly comfortable where the device 10a is sized and/or configured so that a user would typically hold the device 10a in the notch between his thumb and forefinger (with his fingers extending along the back and the thumb on the front or side), with each button 60 being engageable by a different user finger. Preferably, the buttons 60 on the back of the device 10a are recessed so as to be either flush with the back of the device 10a or slightly depressed inside the back surface when not pushed. Also, particularly if the buttons are flush rather than depressed in the device back, the buttons 60 preferably have a different surface texture or "feel" so that the user will be able to operate the buttons 60 by touch without needing to look at them. Since the aspect of the invention described in connection with FIG. 4 requires only one or two buttons, any one or two of the buttons illustrated in FIG. 5 could be connected to provide operation according to the invention, with others of the buttons 60 used for other functions (such as described below, or as function buttons in a cellular phone, for example, when the invention is incorporated in a cellular communication device).

Figure 6:
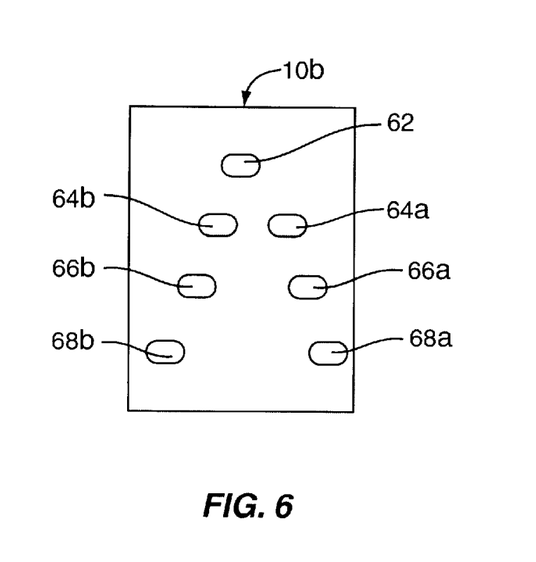
FIG. 6 is a view similar to FIG. 5 of an alternate arrangement of buttons.

FIG. 6 illustrates yet another advantageous arrangement of buttons on a device 10b incorporating the present invention, adapted for use by in both the right and left hands. Specifically, button 62 is provided near the top back of the device 10b, and may be conveniently aligned with the end of a user's forefinger when the device 10b is held in a typical, comfortable angle in the user's hand (whether the left or right hand). Buttons 64a, 66a, and 68a will then naturally tend to align with the middle, ring, and little fingers, respectively, of a user's right hand when held in that hand. Buttons 64b, 66b, and 68b will then naturally tend to align with the middle, ring, and little fingers, respectively, of a user's left hand when held in that hand. Accordingly, button 64a is preferably connected to provide operation identical to button 64b, button 66a is preferably connected to provide operation identical to button 66b, and button 68a is preferably connected to provide operation identical to button 68b, so that identical operation is comfortably provided no matter which hand the user uses to hold the device 10b.

It should also be understood that the a single device 10 could be made which incorporates all of the above disclosed embodiments, with one or more suitable user inputs provided (such as buttons shown in FIGS. 4–6, or other button arrangements and/or a switch and/or touch responsive area on the screen 24) for switching between the different modes of operation. For example, one of the buttons could be connected so that, when depressed, will cause all of the touch responsive areas 26 on the screen 24 to switch from operation according to the FIG. 1 embodiment to operation according to the FIG. 2 embodiment (whereby touching the screen by a user would not switch in and out of panning mode in accordance with the FIG. 1 embodiment, but would enable selected sub-pages to be fully displayed with a touch of the screen area showing a portion of the selected sub-page). Further, a separate button (e.g., button 56 of the FIG. 3 embodiment) could be provided whereby, when depressed, the display on the screen 24 is controlled according to the FIG. 3 embodiment, with the background page essentially stationary and changes in device position causing a pointer 50 to move. In that case, the pointer 50 could, as one alternative, be shown on the screen 24 only when the button activating its use is depressed.

It should thus now be recognized that devices incorporating the present invention may be conveniently and reliably used, thereby maximizing the speed and use of the device and accordingly maximizing the acceptance of the device in the marketplace.

Still other aspects, objects, and advantages of the present invention can be obtained from a study of the specification, the drawings, and the appended claims. It should be understood, however, that the present invention could be used in alternate forms where less than all of the objects and advantages of the present invention and preferred embodiment as described above would be obtained.

What is claimed is:

1. In a data storage device including a screen portion for visually displaying a part of a virtual page larger than said screen portion whereby only a portion of the virtual page is displayed in said screen portion, a display control structure comprising:

at least one sensor mounted on the device and configured to sense changes in position of the device in a reference coordinate system and transmit signals indicative of said changes;

a control circuit adapted to pan said virtual page over said screen portion responsive to signals from said sensor indicative of said position changes when said control circuit is in a panning mode;

at least one touch-responsive first area on said screen portion, said first area when touched by a user placing said control circuit in said panning mode; and a touch-responsive second area on said screen portion, said second area when touched by a user placing said control circuit out of said panning mode and said second area being the part of the virtual page displayed on said screen portion when said device is in said panning mode.

2. The display control structure of claim 1, wherein said first area is located in a corner of the screen portion.

3. The display control structure of claim 2, wherein said screen portion is substantially rectangular shaped with four corners and said first area is located at each of said four corners of said screen portion.

4. In a data storage device including a screen portion for visually displaying a part of a virtual page larger than said screen portion whereby only a portion of the virtual page is displayed in said screen portion, a display control structure comprising:

at least one sensor mounted on the device and configured to sense changes in position of the device in a reference coordinate system and transmit signals indicative of said changes;

a control circuit adapted to pan said virtual page over said screen portion responsive to signals from said sensor indicative of said position changes when said control circuit is in a panning mode;

at least one touch-responsive first area on said screen portion, said first area when touched by a user placing said control circuit in said panning mode; and a touch-responsive second area on said screen portion which is substantially the entirety of the screen portion when said device is in said panning mode, said second area when touched by a user placing said control circuit out of said panning mode.

5. In a data storage device including a screen portion for visually displaying a part of a virtual page larger than said screen portion whereby only a portion of the virtual page is displayed in said screen portion, said virtual page comprising a plurality of discrete sub-pages, a display control structure comprising:

a plurality of discrete touch-responsive areas in different sections of said screen portion, each of said touch-responsive areas being adapted to generate a page signal responsive to being touched by a user;

a sensor adapted to generate a panning signal responsive to selective input by a user;

a first screen portion display control adapted to
   pan over the virtual page responsive to a panning signal, and
   display a selected part of one discrete sub-page responsive to a page signal generated in response to a user touching one of the discrete touch-responsive areas located in a section of the screen portion displaying a portion of said one discrete sub-page.

6. The display control structure of claim 5, wherein said sensor comprises:

at least one orientation sensor mounted on the device and configured to sense changes in position of the device in a reference coordinate system and transmit motion signals indicative of said changes; and a control circuit adapted generate a panning signal responsive to said motion signals.

7. The display control structure of claim 6, further comprising:

a second screen portion display control including at least one touch-responsive first area on said screen portion adapted to selectively place said second screen portion display control in a panning mode whereby said screen portion pans over the virtual page responsive to said panning signal when touched by a user, and a touch-responsive second area on said screen portion adapted to selectively take said second screen portion display control out of said panning mode when touched by a user; and a switch adapted to selectively connecting one of said first and second screen portion display controls to said screen portion.

8. The display control structure of claim 5, wherein said virtual page comprises a plurality of sub-pages with each sub-page oriented side-by-side with at least one of the other the sub-pages.

9. The display control structure of claim 5, wherein said screen portion is substantially as large as each sub-page.

10. The display control structure of claim 5, wherein each sub-page is a logical unit of said virtual page.

11. In a data storage device including a screen portion for visually displaying a pointer and a virtual page including command areas, said virtual page providing a user interface for generating a command signal to control a program in said device, an interface control structure comprising:

at least one sensor mounted on the device and configured to sense changes in position of the device in a reference coordinate system and transmit signals indicative of said changes;

a control circuit adapted to move said pointer in said screen portion responsive to signals from said sensor indicative of said position changes when said control circuit is in a move mode; and a touch-responsive first area overlaying at least a portion of one or more said command areas of said virtual page and adapted to maintain said control circuit in said move mode during touching of the first area by a user.

12. The interface control structure of claim 11, further comprising a command control adapted to generate a program command signal responsive to the pointer being located in one of the command areas of the virtual page when touching of the first area by a user ceases.

13. The interface control structure of claim 11, further comprising a touch-responsive second area adapted to generate a program command signal responsive to the pointer being located in one of the command areas when the second area is touched by a user.

14. The interface control structure of claim 13, wherein said first and second areas comprise push buttons.

15. The interface control structure of claim 14, wherein said screen portion is disposed on one side of said device and said push buttons are located on a side of said device different than the one side.

16. A method of controlling a touch sensitive display screen to display a virtual page that is larger than said display screen, said method comprising:

defining said virtual page as a composite of two or more subpages;

displaying adjacent portions of at least two of said subpages on said display screen;

identifying a selected subpage by sensing a touch input in an area of said display screen where one of said subpages is displayed; and displaying a predetermined portion of said selected subpage in response to said touch input.

17. The method of claim 16 further comprising panning over said virtual page in response to a control signal when placed in a panning mode.

18. The method of claim 17 further comprising entering said panning mode in response to a panning signal.

19. The method of claim 18 wherein further comprising generating said panning signal in response to a touch input detected in a first touch sensitive area of said display screen.

20. The method of claim 19 further comprising exiting said panning mode in response to a touch input detected in a second touch sensitive area of said display screen.

21. The method of claim 17 further comprising sensing the orientation of a control device when placed in said panning mode, and generating said control signal responsive to the sensed orientation of said control device.

22. A display controller to control a touch sensitive display screen to display a virtual page that is larger than the display screen, said display controller comprising a processor programmed to:

define said virtual page as a composite of two or more subpages;

display adjacent portions of at least two of said subpages on said display screen;

identify a selected subpage by sensing a touch input in an area of said display screen where one of said subpages is displayed; and display a predetermined portion of said selected subpage in response to said touch input.

23. The display controller of claim 22 wherein said processor is further programmed to pan over said virtual page in response to a control signal when placed in a panning mode.

24. The display controller of claim 23 wherein said processor is further programmed to enter said panning mode in response to a panning signal.

25. The display controller of claim 24 wherein said processor is further programmed to generate said panning signal in response to a touch input detected in a first touch sensitive area of said display screen.

26. The display controller of claim 25 wherein said processor is further programmed to exit said panning mode in response to a touch input detected in a second touch sensitive area of said display screen.

27. The display controller of claim 24 wherein said processor is further programmed to sense the orientation of a control device when placed in said panning mode, and to generate said control signal responsive to the sensed orientation of said control device.

28. A display device comprising:

a touch sensitive display screen having one or more touch sensitive areas;

a display controller to control the display of a virtual page larger than said display screen, said display controller programmed to:

define said virtual page as a composite of two or more subpages;

display adjacent portions of at least two of said subpages on said display screen;

identify a selected subpage by sensing a touch input in an area of said display screen where one of said subpages is displayed; and display a predetermined portion of said selected subpage in response to said touch input.

29. The display device of claim 28 wherein said display controller is further programmed to pan over said virtual page in response to a control signal when placed in a panning mode.

30. The display device of claim 29 further comprising entering said panning mode in response to a panning signal.

31. The display device of claim 30 wherein said display controller is further programmed to generate said panning signal in response to a touch input detected in a first touch sensitive area of said display screen.

32. The display device of claim 31 wherein said display controller is further programmed to exit said panning mode in response to a touch input detected in a second touch sensitive area of said display screen.

33. The display device of claim 30 wherein said display controller is further programmed to sense the orientation of a control device when placed in said panning mode, and to generate said control signal responsive to the sensed orientation of said control device.

34. A method of controlling a touch sensitive display screen to display a virtual page that is larger than said display screen, said method comprising:

defining said virtual page as a composite of two or more subpages;

displaying one or more subpages of said virtual page on said display screen;

associating a first touch sensitive area on said display screen with one of said subpages, wherein said touch sensitive area overlays at least a portion of the one or more subpages displayed on said display screen;

sensing a touch input in said first touch sensitive area; and displaying a predetermined portion of the associated subpage in response to said touch input.

35. The method of claim 34 wherein said first touch sensitive area is associated with a subpage displayed in said first touch sensitive area.

36. The method of claim 34 further comprising panning over said virtual page in response to a control signal when placed in a panning mode.

37. The method of claim 36 further comprising entering said panning mode in response to a panning signal.

38. The method of claim 37 wherein further comprising generating said panning signal in response to a touch input detected in a first touch sensitive area of said display screen.

39. The method of claim 38 further comprising exiting said panning mode in response to a touch input detected in a second touch sensitive area of said display screen.

40. The method of claim 37 further comprising sensing the orientation of a control device when placed in said panning mode, and generating said control signal responsive to the sensed orientation of said control device.

41. A method of controlling a display screen to display a virtual page that is larger than the display screen, the method comprising:

displaying one or more subpages on said display screen representing at least a portion of said virtual page;

generating a panning signal responsive to a touch input to a touch sensitive area of said display screen overlaying at least a portion of the one or more subpages;

enabling a panning mode responsive to the panning signal;

sensing an orientation of a device containing the display screen when the panning mode is enabled; and panning over the virtual page based on the orientation of the device.

42. The method of claim 41 further comprising:

disabling the panning mode responsive to a subsequent panning signal; and maintaining a current screen view on the display screen independent of the orientation of the device containing the display screen when the panning mode is disabled.

43. The method of claim 41 wherein sensing an orientation of a device containing the display screen comprises:

generating a control signal based on an orientation sensor contained in the device; and panning over the virtual page responsive to the control signal.

44. The method of claim 43 wherein the control signal comprises a directional attribute based on the sensed orientation of the device, and further comprising panning over the virtual page in a direction determined by the directional attribute of the control signal.

45. A control circuit for controlling a display screen to display a virtual page that is larger than the display screen, the control circuit comprising a processor programmed to:

display one or more subpages on said display screen representing at least a portion of said virtual page;

generate a panning signal responsive to a touch input to a touch sensitive area of said display screen overlaying at least a portion of the one or more subpages;

enable a panning mode responsive to the panning signal;

determine an orientation of a device containing the display screen when the panning mode is enabled; and pan over the virtual page based on the orientation of the device.

46. The control circuit of claim 45 wherein the processor is further programmed to:

disable the panning mode responsive to a subsequent panning signal; and maintain a current screen view on the display screen independent of the orientation of the device containing the display screen when the panning mode is disabled.

47. The control circuit of claim 45 wherein the processor is further programmed to:

receive a control signal from a position sensor contained in the device;

determine a relative position of the device based on the control signal; and pan over the virtual page based on the relative position of the device.

48. The control circuit of claim 47 wherein the processor is further programmed to:

determine a directional attribute of the control signal; and pan over the virtual page in a direction determined by the directional attribute of the control signal.

* * * * *